US011350009B2

(12) United States Patent
Saito (10) Patent No.: US 11,350,009 B2
(45) Date of Patent: May 31, 2022

(54) SEVER FOR SENDING FACSIMILE REQUEST INFORMATION TO FUNCTION EXECUTION DEVICE BY USING SERVER-PUSH COMMUNICATION (71) Applicant: BROTHER KOGYO KABUSHIKI KAISHA, Nagoya (JP)

(72) Inventor: Ken Saito, Tokoname (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 8 days.

(21) Appl. No.: 17/032,250

(22) Filed: Sep. 25, 2020

(65) Prior Publication Data

US 2021/0099604 A1     Apr. 1, 2021

(30) Foreign Application Priority Data

Sep. 26, 2019   (JP) .............................. JP2019-175624
Aug. 28, 2020   (JP) .............................. JP2020-144307

(51) Int. Cl.
*H04N 1/00*       (2006.01)
*H04N 1/32*       (2006.01)

(52) U.S. Cl.
CPC ..... *H04N 1/32096* (2013.01); *H04N 1/00217* (2013.01); *H04N 1/3208* (2013.01)

(58) Field of Classification Search
CPC ........... H04N 1/32096; H04N 1/00217; H04N 1/32496
See application file for complete search history.

(56) References Cited

U.S. PATENT DOCUMENTS

| 5,552,901 A | 9/1996 | Kikuchi et al. |
| 2013/0332546 A1* | 12/2013 | Miyazawa .............. H04L 51/18 709/206 |
| 2015/0293727 A1* | 10/2015 | Miyazawa ............ G06F 3/1285 358/1.15 |
| 2016/0098233 A1* | 4/2016 | Nishida ................ H04N 1/4413 358/1.14 |
| 2019/0245854 A1* | 8/2019 | Saito ....................... H04L 63/08 |
| 2019/0327379 A1* | 10/2019 | Kim .................. H04N 1/00244 |

FOREIGN PATENT DOCUMENTS

JP      2002330254 A      11/2002

* cited by examiner

*Primary Examiner* — Benjamin O Dulaney
(74) *Attorney, Agent, or Firm* — Scully, Scott, Murphy & Presser, P.C.

(57) ABSTRACT

A server may establish a session with a function execution device via the Internet, the session being for executing server-push communication, the function execution device being capable of executing at least a facsimile function, receive first image data from a terminal device via the Internet, and in a case where the first image data is received from the terminal device, send facsimile request information to the function execution device via the Internet by using the session, the facsimile request information being for requesting a facsimile transmission of an image corresponding to the first image data.

11 Claims, 7 Drawing Sheets

FIG. 4
(Printing of E-mail Address (Continuation of FIG.3))

SEVER FOR SENDING FACSIMILE REQUEST INFORMATION TO FUNCTION EXECUTION DEVICE BY USING SERVER-PUSH COMMUNICATION

CROSS-REFERENCE TO RELATED APPLICATION

This application claims priority to Japanese Patent Application No. 2019-175624 filed on Sep. 26, 2019 and Japanese Patent Application No. 2020-144307 filed on Aug. 28, 2020, the contents of which are hereby incorporated by reference into the present application.

TECHNICAL FIELD

The disclosure herein discloses art related to a server configured to request a facsimile transmission to a function execution device.

DESCRIPTION OF RELATED ART

A system provided with a FAX server and a remote FAX machine is known. The FAX server and the remote FAX machine are connected to a Local Area Network (LAN). The FAX server sends image data to the remote FAX machine through the LAN to request a FAX transmission. The remote FAX machine converts the image data to FAX data and sends the converted data to a destination FAX machine through a public communication network.

SUMMARY

The above technique does not give any consideration to a situation in which the FAX server requests a FAX transmission to the remote FAX machine via the Internet.

The disclosure herein provides art that enables a server to send facsimile request information to a function execution device via the Internet.

A server disclosed herein may comprise: a processor; and a memory storing computer-readable instructions therein, wherein the computer-readable instructions, when executed by the processor, cause the server to: establish a session with a function execution device via the Internet, the session being for executing server-push communication, the function execution device being configured to execute at least a facsimile function; receive first image data from a terminal device via the Internet; and in a case where the first image data is received from the terminal device, send facsimile request information to the function execution device via the Internet by using the session, the facsimile request information being for requesting a facsimile transmission of an image corresponding to the first image data.

A control method implemented by the server, a computer program for the server, and a non-transitory computer-readable medium storing computer-readable instructions for the server are also novel and useful.

EMBODIMENTS

First Embodiment

Figure 1:
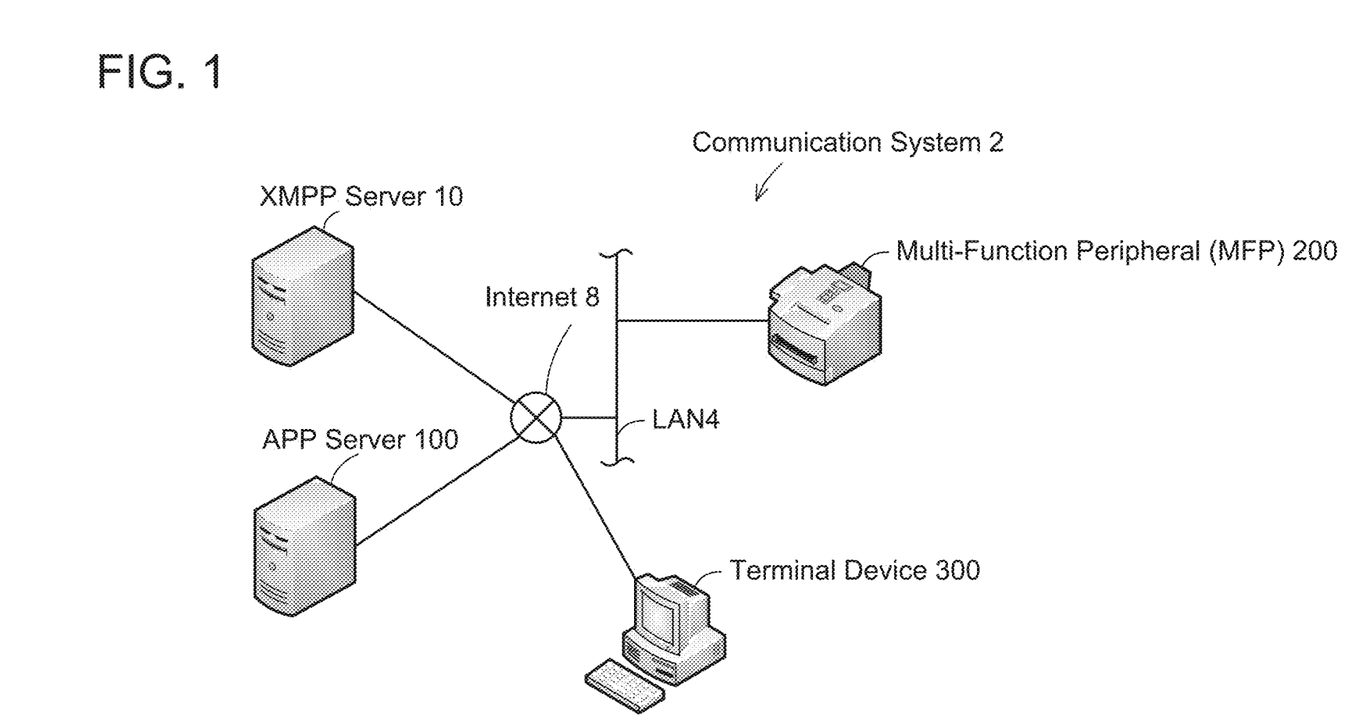
FIG. 1 shows a configuration of a communication system.

Configuration of Communication System 2: FIG. 1

As shown in FIG. 1, a communication system 2 is provided with an Extensible Messaging and Presence Protocol (XMPP) server 10, an APP server 100, a multi-function peripheral 200, and a terminal device 300. Hereinbelow, the multi-function peripheral will be termed "MFP".

The XMPP server 10, the APP server 100, and the terminal device 300 are connected to the Internet 8. The XMPP server 10 is configured to be communicable with the respective devices 100, 300 via the Internet 8. Further, the MFP 200 is connected to a Local Area Network (LAN) 4. The LAN 4 is connected to the Internet 8. The MFP 200 is configured to be communicable with the respective devices 10, 100, 300 via the LAN 4 and the Internet 8. The LAN 4 may be a wired LAN or a wireless LAN.

Figure 2:
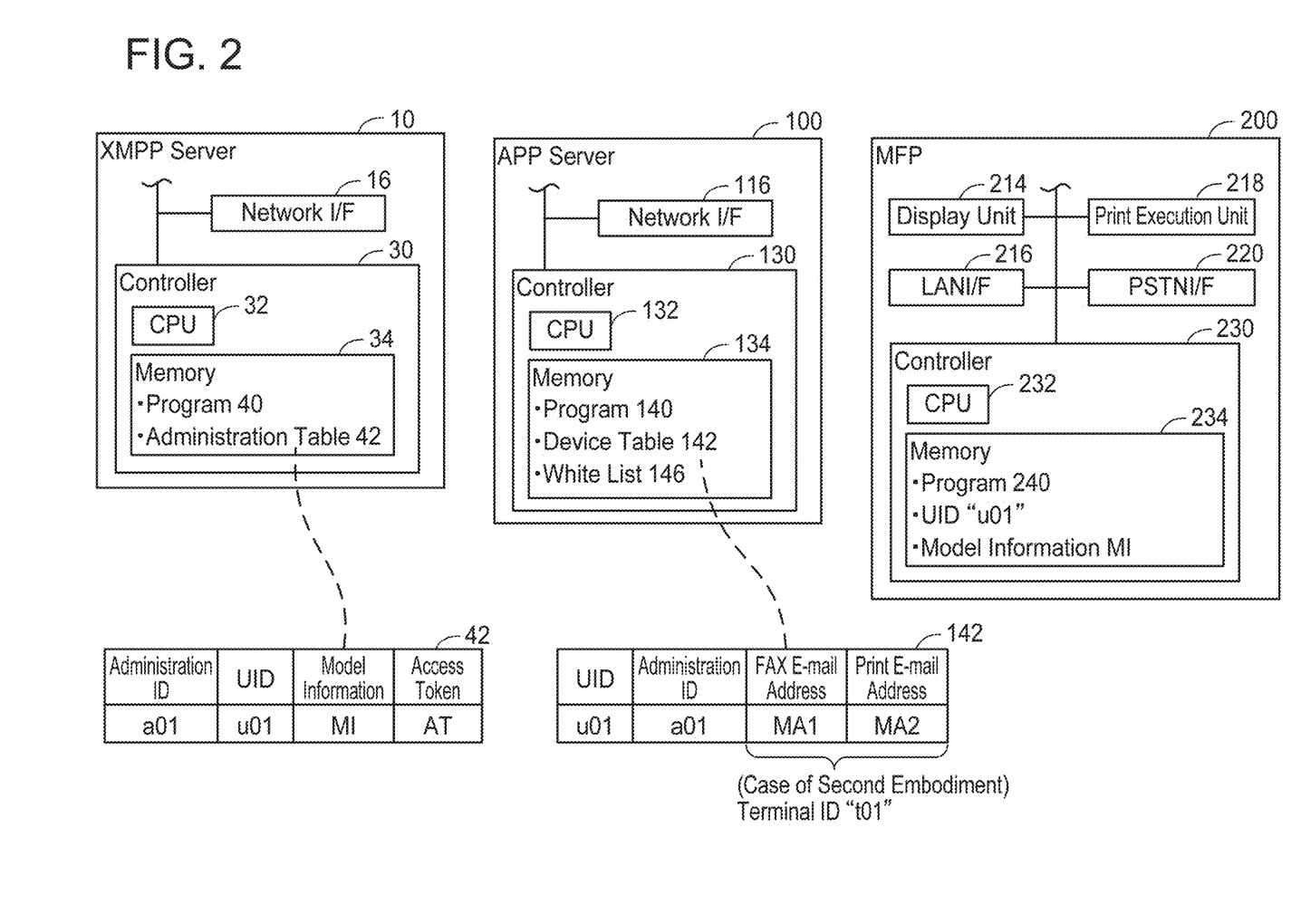
FIG. 2 shows a block diagram showing a configuration of each device in the communication system.

Configuration of XMPP Server 10: FIG. 2

The XMPP server 10 is a server for establishing an XMPP session with an MFP (such as the MFP 200). The XMPP server 10 is installed on the Internet 8 by a vendor of, for example, the MFP 200.

The XMPP session is a session according to the XMPP. By using the XMPP session, the XMPP server 10 can send information to the MFP beyond a firewall of a LAN to which this MFP belongs (such as a firewall formed by a router) even without receiving a request from the MFP. That is, the XMPP session is a session that enables server-push communication. The XMPP session remains established until power of the MFP is turned off. The scheme for sending information from the XMPP server 10 to the MFP (that is, the scheme for executing the server-push communication) may not be the XMPP session, but may be another scheme. For example, a session according to Hypertext Transfer Protocol Secure (HTTPS) may be established between the MFP and the XMPP server 10.

The XMPP server 10 comprises a network interface 16 and a controller 30. The respective modules 16, 30 are connected to a bus line (reference sign omitted). Hereinbelow, an interface will be denoted "I/F". The network I/F 16 is an I/F configured to execute communication via the Internet 8, and is connected to the Internet 8 (see FIG. 1). The controller 30 is provided with a CPU 32 and a memory 34. The CPU 32 is configured to execute various processes according to a program 40 stored in the memory 34. The memory 34 is configured of a volatile memory, a nonvolatile memory, and the like. In addition to the aforementioned program 40, the memory 34 further stores an administration table 42.

The administration table 42 is a table for managing information related to MFPs. The administration table 42 stores, for each of a plurality of MFPs, an administration Identifier (ID) for managing the MFP, a UID which is identification information obtained from the MFP, model information of the MFP, and an access token of the MFP in association with each other. The model information indicates information related to a model of the corresponding MFP (such as a model name and functions). The access token is authentication information for establishing an XMPP session with the corresponding MFP.

Configuration of APP Server 100

The APP server 100 is a server configured to execute communication for e-mail FAX and e-mail print with an MFP (such as the MFP 200). The e-mail FAX is a function to cause the MFP to execute facsimile transmission of an image corresponding to image data included in an e-mail. The e-mail print is a function to cause the MFP to execute printing of an image corresponding to image data included in an e-mail. The APP server 100 is installed on the Internet 8 by the vendor of, for example, the MFP 200.

The APP server 100 comprises a network I/F 116 and a controller 130. The respective modules 116, 130 are connected to a bus line (reference sign omitted). The network I/F 116 is connected to the Internet 8 (see FIG. 1). The controller 130 is provided with a CPU 132 and a memory 134. The CPU 132 is configured to execute various processes according to a program 140 stored in the memory 134. In addition to the aforementioned program 140, the memory 134 further stores a device table 142 and a white list 146.

The device table 142 is a table in which information related to MFPs is registered. The device table 142 stores, for each of a plurality of MFPs, a UID obtained from the MFP, the administration ID stored in association with this UID in the XMPP server 10, a FAX e-mail address used for the e-mail FAX, and a print e-mail address used for the e-mail print in association with each other.

The white list 146 is a list of e-mail addresses. When receiving an e-mail, the APP server 100 determines that a source e-mail address of the e-mail is valid in a case where this source e-mail address is included in the white list 146. On the other hand, in a case where the source e-mail address of the e-mail is not included in the white list 146, the APP server 100 determines that this e-mail address is not valid. The white list 146 is stored in the memory 134 in association with a UID "u01" of the MFP 200. The white list 146 is registered to the APP server 100 in response to a predetermined operation being performed by a user on a device that can access the APP server 100 (such as the terminal device 300). That is, the white list 146 is not registered to the APP server 100 unless the predetermined operation is performed.

For example, for the e-mail FAX, the APP server 100 and the XMPP server 10 operate in cooperation. Although details thereof will be described later, use of the XMPP session enables the MFP to execute a facsimile transmission of an image corresponding to image data included in an e-mail without receipt of a request from the MFP. Further, the vendor may install an APP server different from the APP server 100 on the Internet 8. This other APP server is a server for executing communication with the MFP for a function using the Internet 8 other than the e-mail FAX (such as a function of sending a setting value to the MFP via the Internet 8). For this other function as well, the other APP server and the XMPP server 10 operate in cooperation. That is, the single XMPP server 10 and a plurality of APP servers operate in cooperation. The establishment of the XMPP session between the single XMPP server 10 and the MFP enables the MFP to execute a plurality of functions using the Internet 8.

Configuration of MFP 200

The MFP 200 is a peripheral device configured to execute multiple functions including a print function, a scan function, and a facsimile function (i.e., a peripheral device of a terminal device connected to the LAN 4). The MFP 200 includes a display unit 214, a LAN I/F 216, a print execution unit 218, a Public Switched Telephone Network (PSTN) I/F 220, and a controller 230. The respective units 214 to 230 are connected to a bus line (reference sign omitted). The display unit 214 is a display configured to display various types of information. The display unit 214 is a so-called touch panel, and functions also as an operation unit. The LAN I/F 216 is connected to the LAN 4 (see FIG. 1). The print execution unit 218 is provided with a print mechanism of an inkjet scheme or a laser scheme, for example. The PSTN I/F 220 is an I/F configured to execute facsimile communication.

The controller 230 is provided with a CPU 232 and a memory 234. The CPU 232 is configured to execute various processes according to a program 240 stored in the memory 234. The memory 234 further stores the UID "u01" of the MFP 200 and model information MI of the MFP 200. The UID is information for identifying a user who uses the MFP 200 (such as an account name). In a variant, the UID may be information for identifying the MFP 200 (such as a serial number).

Figure 3:
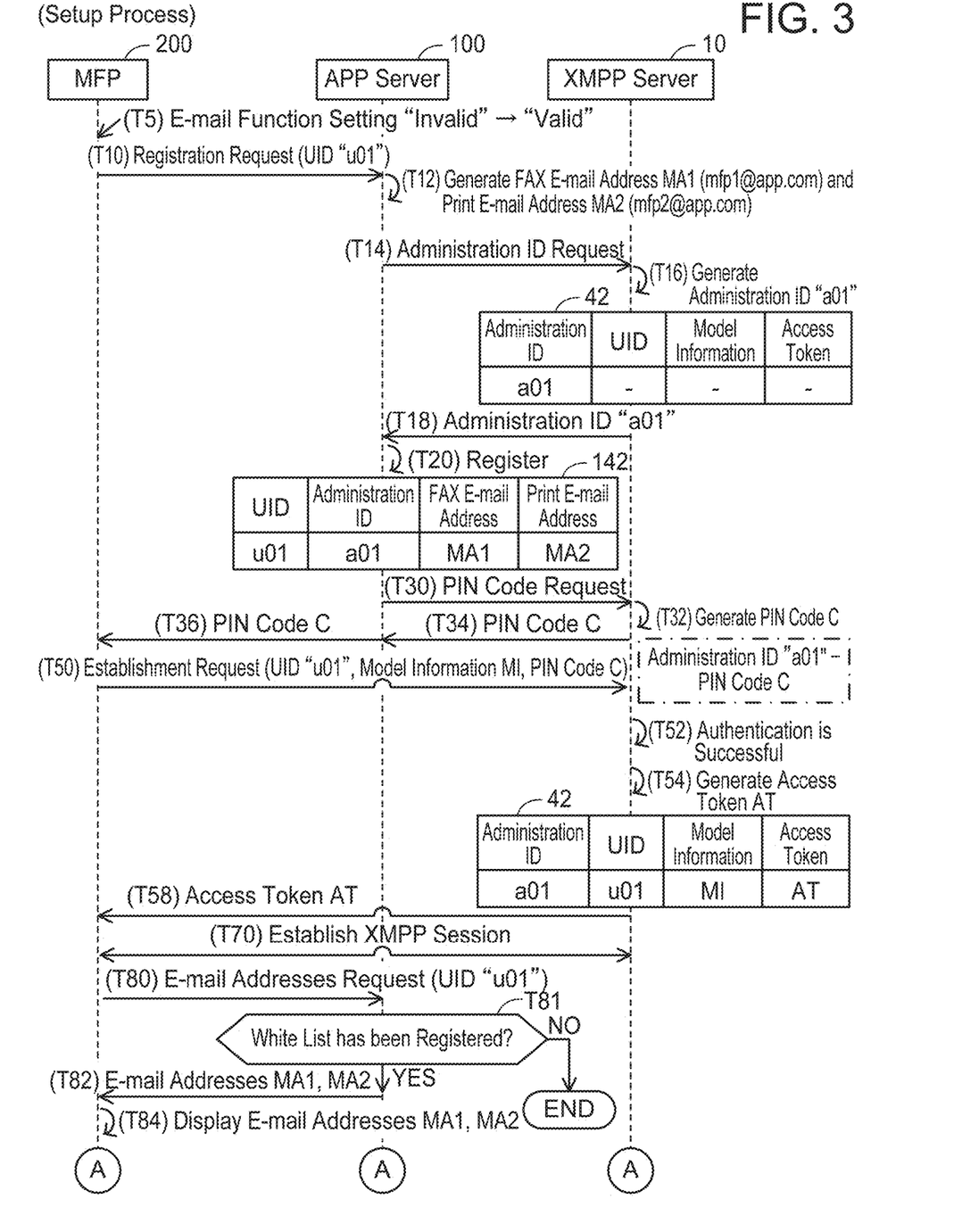
FIG. 3 shows a sequence diagram of a setup process.
Figure 4:
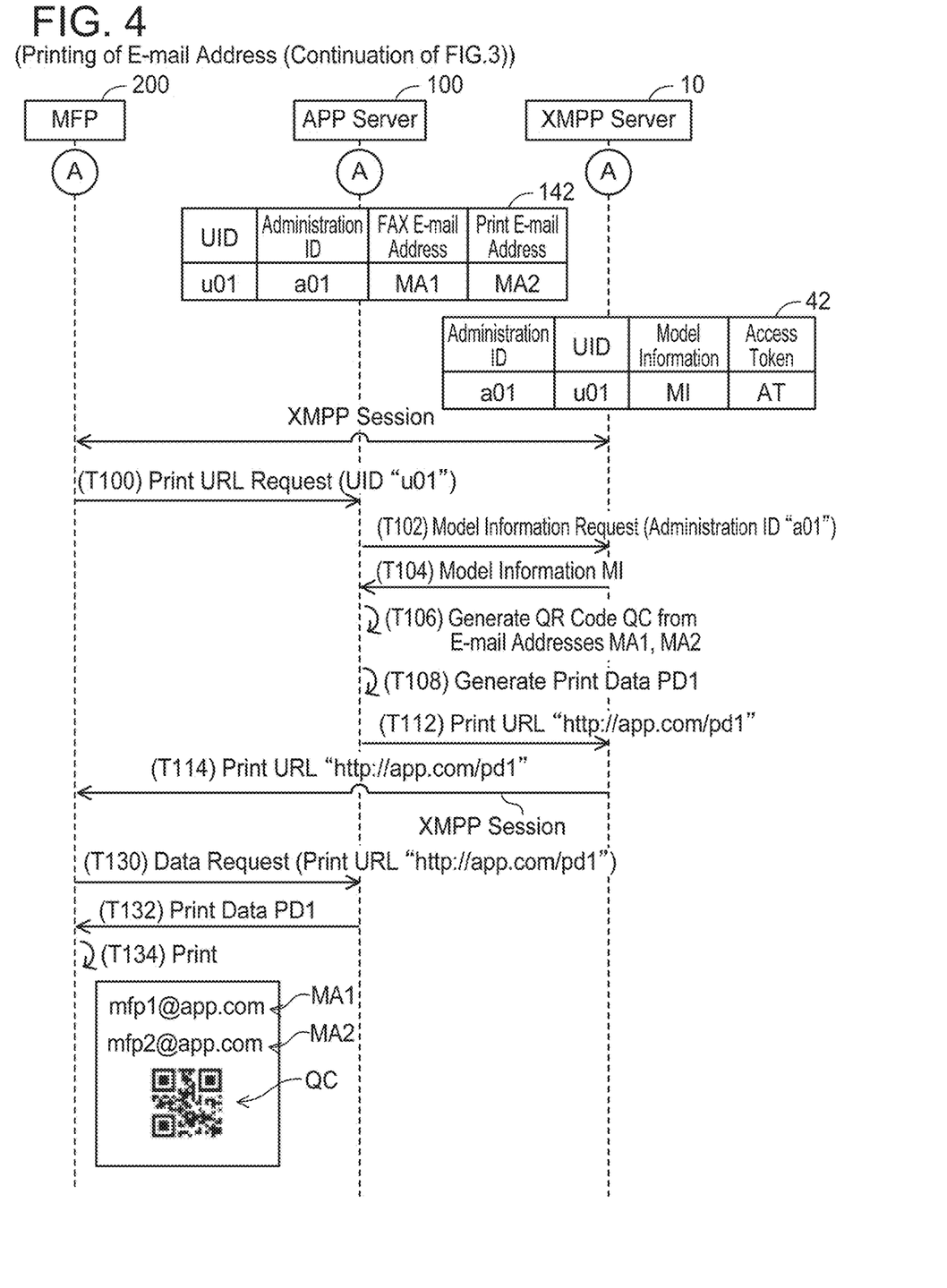
FIG. 4 shows a continuation of FIG. 3.

Setup Process: FIGS. 3 and 4

A setup process of registering information used in communication for the e-mail FAX and the e-mail print to the APP server 100 and establishing an XMPP session will be described with reference to FIGS. 3 and 4. Hereinbelow, for easier understanding, processes executed by the CPUs of the respective devices (such as the CPU 32 of the XMPP server 10) will be described with the respective devices (such as the XMPP server 10) as the subject of action, instead of describing the processes with the CPUs as the subject of action. Further, hereinbelow, communication is executed between the MFP 200 and the respective servers 10, 100 via the LAN 4 and the Internet 8. Further, communication is executed between the XMPP server 10 and the APP server 100 via the Internet 8. Hereinbelow, unless otherwise noted, phrases of "via the LAN 4" and "via the Internet 8" will be omitted.

In T5, the MFP 200 accepts, from the user, an operation for changing an e-mail function setting from "invalid" to "valid". The e-mail function setting indicates a setting on whether to allow execution of the e-mail FAX and the e-mail print. "Invalid" indicates prohibiting the execution of the e-mail FAX and the e-mail print, and "valid" indicates allowing the execution of the e-mail FAX and the e-mail print. The e-mail function setting indicates "invalid" by default.

When the e-mail function setting is changed from "invalid" to "valid" in T5, the MFP 200 sends, to the APP server 100 in T10, a registration request that requests registration of information to be used in the communication for the e-mail FAX and the e-mail print. The registration request includes the UID "u01".

When receiving the registration request from the MFP 200 in T10, the APP server 100 generates a FAX e-mail address MA1 and a print e-mail address MA2 in T12. For example, the FAX e-mail address MA1 includes a local part "mfp1" and a domain name "app.com" of the APP server 100.

In T14, the APP server 100 sends, to the XMPP server 10, an administration ID request that requests an administration ID to the XMPP server 10.

In a case of receiving the administration ID request from the APP server 100 in T14, the XMPP server 10 generates an administration ID "a01" and stores this administration ID "a01" in the administration table 42 in T16.

In T18, the XMPP server 10 sends the administration ID "a01" to the APP server 100.

When receiving the administration ID "a01" from the XMPP server 10 in T18, the APP server 100 stores the UID "u01" in the registration request of T10, the administration ID "a01" received in T18, and the e-mail addresses MA1, MA2 generated in T12 in association with each other in the device table 142 in T20. The information to be used in the communication for the e-mail FAX and the e-mail print is thereby registered in the APP server 100.

Next, in T30, the APP server 100 sends a PIN code request that requests a Personal Identification Number (PIN) code to the XMPP server 10.

When receiving the PIN code request from the APP server 100 in T30, the XMPP server 10 generates a PIN code C in T32. The XMPP server 10 stores the administration ID "a01" and the PIN code C in association with each other in the memory 34.

In T34, the XMPP server 10 sends the PIN code C to the APP server 100. Due to this, the APP server 100 sends the PIN code C, received from the XMPP server 10 to the MFP 200 in T36.

When receiving the PIN code C from the APP server 100 in T36, the MFP 200 sends an establishment request that requests establishment of an XMPP session to the XMPP server 10 in T50. The establishment request includes the UID "u01", the model information MI, and the PIN code C.

When receiving the establishment request from the MFP 200 in T50, the XMPP server 10 executes authentication of the PIN code in the establishment request in T52. In the present case, the PIN code C in the establishment request matches the PIN code C in the memory 34 of the XMPP server 10, thus the authentication of the PIN code succeeds. Then, the XMPP server 10 executes processes from T54. If the authentication of the PIN code fails, the XMPP server 10 does not execute the processes from T54.

In T54, the XMPP server 10 generates an access token AT. The XMPP server 10 identifies the administration ID "a01" stored in association with the PIN code C from the memory 34. Then, the XMPP server 10 stores the identified administration ID "a01", the UID "u01" in the establishment request, the model information MI in the establishment request, and the generated access token AT in association with each other in the administration table 42.

In T58, the XMPP server 10 sends the access token AT to the MFP 200. Due to this, in T70, the MFP 200 establishes an XMPP session with the XMPP server 10 by using the access token AT.

Further, when the establishment of the XMPP session has been completed, the MFP 200 sends an e-mail address request that requests a FAX e-mail address and a print e-mail address to the APP server 100 in T80. The e-mail address request includes the UID "u01".

When receiving the e-mail address request from the MFP 200 in T80, the APP server 100 determines in T81 whether the white list 146 has been registered in the APP server 100. In a case of determining that the white list 146 has been registered in the APP server 100 (YES in T81), the APP server 100 sends the e-mail addresses MA1, MA2 stored in association with the UID "u01" in the e-mail address request to the MFP 200 in T82. Due to this, in T84, the MFP 200 causes the display unit 214 to display the FAX e-mail address MA1 and the print e-mail address MA2. The user can acknowledge the FAX e-mail address MA1 and the print e-mail address MA2.

In a case of determining that the white list 146 has not been registered yet in the APP server 100 (NO in T81), the APP server 100 skips processes from T82 and terminates the process of FIG. 3. If the FAX e-mail address MA1 and the like are acknowledged by users in a situation where the white list 146 has not been registered yet in the APP server 100, a user who is not authorized to use the e-mail FAX and the like may use the e-mail FAX and the like. According to the configuration above, the FAX e-mail address MA1 and the print e-mail address MA2 are not displayed in the case where the white list 146 has not been registered yet in the APP server 100, which can prevent the e-mail FAX and the e-mail print from being used by the user who is not authorized to use the e-mail FAX and the like. In a variant, the APP server 100 may send only the print e-mail address MA2 to the MFP 200 in the case where the white list 146 has not been registered yet in the APP server 100. That is, in the case where the white list 146 has not been registered yet in the APP server 100, the print e-mail address MA2 may be displayed on the MFP 200, while the FAX e-mail address MA1 may not be displayed on the MFP 200.

Subsequently, as shown in FIG. 4, the MFP 200 prints the FAX e-mail address MA1 and the print e-mail address MA2. Specifically, the MFP 200 sends a print URL request that requests a print URL for printing the e-mail addresses MA1, MA2 to the APP server 100 in T100. The print URL request includes the UID "u01".

When receiving the print URL request from the MFP 200 in T100, the APP server 100 identifies the information stored in association with the UID "u01" in the print URL request (i.e., the administration ID "a01" and the e-mail addresses MA1, MA2) from the device table 142. Then, in T102, the APP server 100 sends a model information request that requests model information to the XMPP server 10. The model information request includes the identified administration ID "a01".

When receiving the model information request from the APP server 100 in T102, the XMPP server 10 sends the model information MI stored in association with the administration ID "a01" in the model information request to the APP server 100 in T104.

When receiving the model information MI from the XMPP server 10 in T104, the APP server 100 generates a QR code (registered trademark) QC in T106 by coding the e-mail addresses MA1, MA2.

In T108, the APP server 100 generates image data corresponding to an image including the e-mail addresses MA1, MA2 and the generated QR code QC. Then, the APP server 100 converts this image data using the model information MI, to generate print data PD1 having a data format that the MFP 200 can interpret. Here, the APP server 100 generates the print data PD1 according to a print setting that is prestored in the APP server 100.

In T112, the APP server 100 sends a print URL "http://app.com/pd1" to the XMPP server 10. The print URL "http://app.com/pd1" indicates a location within the APP server 100 where the print data PD1 is stored. A character string "pd1" in the print URL "http://app.com/pd1" is a file name of the print data PD1.

When receiving the print URL "http://app.com/pd1" from the APP server 100 in T112, the XMPP server 10 uses the XMPP session with the MFP 200 to send the print URL "http://app.com/pd1" to the MFP 200 in T114.

When receiving the print URL "http://app.com/pd1" from the XMPP server 10 in T114, the MFP 200 sends a data request that requests print data to the APP server 100. The data request is an HTTP command including the print URL "http://app.com/pd1".

When receiving the data request from the MFP 200 in T130, the APP server 100 sends the print data PD1 stored at the location indicated by the print URL "http://app.com/pd1" in the data request to the MFP 200 in T132.

When receiving the print data PD1 from the APP server 100 in T132, the MFP 200 prints the image including the e-mail addresses MA1, MA2 and the QR code QC according to the print data PD1 in T134. Due to this, the user can acknowledge the e-mail addresses MA1, MA2. Further, the user can input the e-mail addresses MA1, MA2 to a terminal device (such as 300) by operating the terminal device to capture the QR code QC by a camera of the terminal device.

Figure 5:
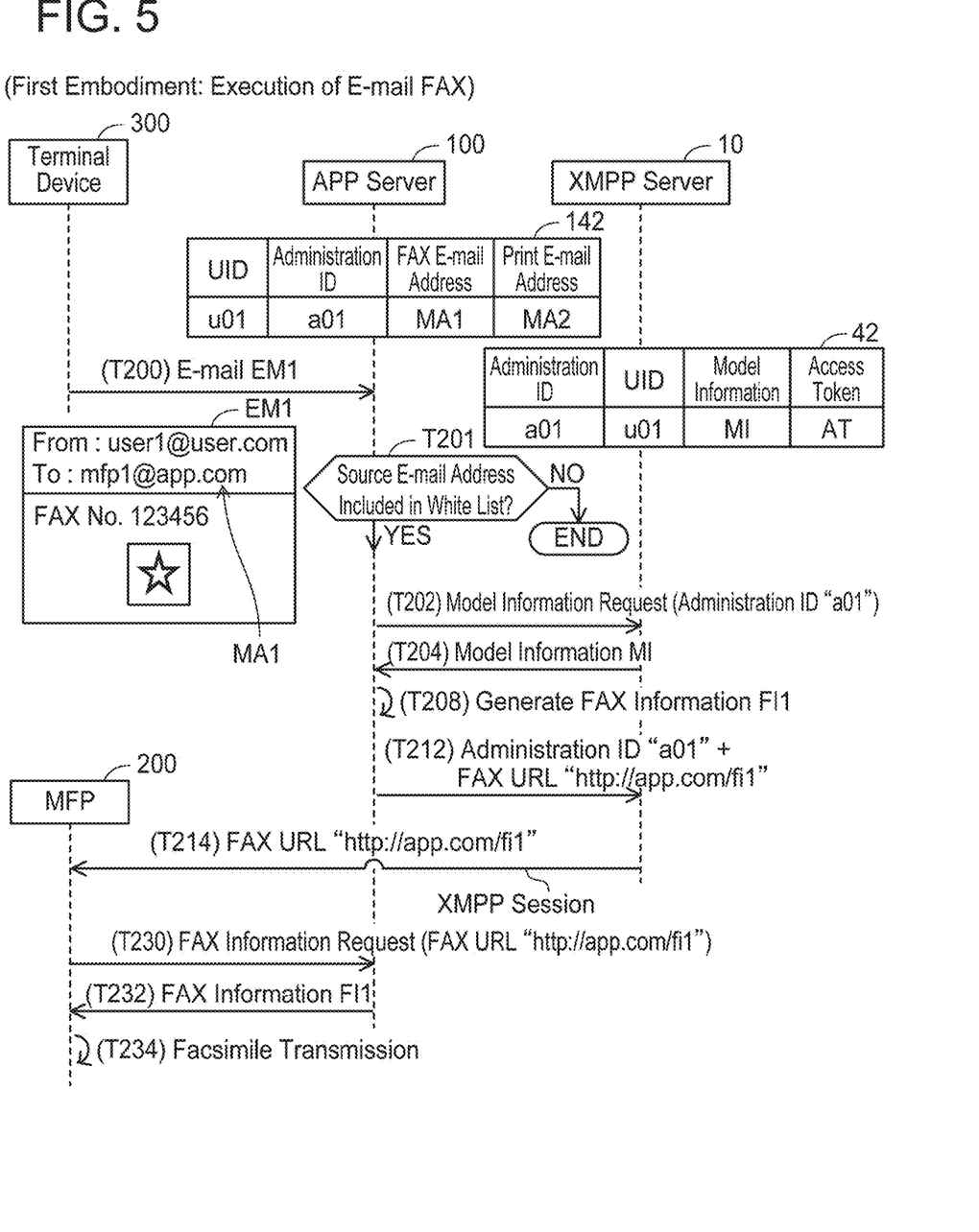
FIG. 5 shows a sequence diagram of a process for executing an e-mail FAX.

Process for Executing E-mail FAX: FIG. 5

A process for executing the e-mail FAX will be described with reference to FIG. 5. In T200, the terminal device 300 sends an e-mail EM1 including the FAX e-mail address MA1 as a destination address to the APP server 100. The e-mail EM1 includes a FAX number (i.e., a phone number) indicating a destination of facsimile transmission and image data corresponding to a target image of the facsimile transmission. The image data is described by using a specific scheme. For example, the specific scheme is any one of Microsoft Word, Microsoft Power Point, Microsoft Excel, TXT, BMP, GIF, PNG, JPEG, TIFF and PDF.

When receiving the e-mail EM1 from the terminal device 300 in T200, the APP server 100 identifies the UID "u01" and the administration ID "a01", which are stored in association with the FAX e-mail address MA1 included in the e-mail EM1, from the device table 142. Then, the APP server 100 identifies the white list 146 stored in association with the identified UID "u01" from the memory 134.

In T201, the APP server 100 determines whether the source e-mail address of the e-mail EM1 is included in the white list 146. In a case of determining that the source e-mail address is included in the white list 146 (YES in T201), the APP server 100 proceeds to processes from T202. On the other hand, in a case of determining that the source e-mail address is not included in the white list 146 (NO in T201), the APP server 100 skips the processes from T202 and terminates the process of FIG. 5. Such a configuration can prohibit the use of the e-mail FAX by a user who is not authorized by the user of the MFP 200.

T202 and T204 are similar to T102 and T104 of FIG. 4. In T208, the APP server 100 uses the model information MI to generate FAX information FI1 including the image data and the FAX number that are included in the e-mail EM1 and an execution instruction for facsimile transmission. The FAX information FI1 has a format which the MFP 200 can interpret.

In T212, the APP server 100 sends the administration ID "a01" and a FAX URL "http://app.com/fi1" to the XMPP server 10. The FAX URL "http://app.com/fi1" indicates a location within the APP server 100 where the FAX information FI1 is stored, and a character string "fi1" is a file name of the FAX information FI1.

When receiving the administration ID "a01" and the FAX URL "http://app.com/fi1" in T212, the XMPP server 10 uses the XMPP session to send the FAX URL "http://app.com/fi1" to the MFP 200 in T214.

When receiving the FAX URL "http://app.com/fi1" from the XMPP server 10 in T214, the MFP 200 sends a FAX information request that requests FAX information to the APP server 100. The FAX information request is an HTTP command including the FAX URL "http://app.com/fi1". By using the FAX URL, the FAX information can be received from the APP server 100 using a general-purpose HTTP command.

When receiving the FAX information request from the MFP 200 in T230, the APP server 100 obtains the FAX information FI1 from the location within the APP server 100 indicated by the FAX URL "http://app.com/fi1".

In T232, the APP server 100 sends the FAX information FI1 to the MFP 200. Due to this, the MFP 200 converts the image data included in the FAX information FI1 in accordance with the execution instruction in the FAX information FI1, to generate facsimile data in T234. Then, the MFP 200 sends the generated facsimile data with the FAX number included in the FAX information FI1 as its destination via the PSTN I/F 118 (i.e., executes a facsimile transmission).

According to this configuration, the XMPP server 10 uses the XMPP session to send the FAX URL "http://app.com/fi1" to the MFP 200 (T214) in the case where the e-mail EM1 including the image data is received from the terminal device 300. By using the XMPP session for executing the server-push communication, the XMPP server 10 can send the FAX URL "http://app.com/fi1" to the MFP 200 without being interrupted by the firewall between the XMPP server 10 and the MFP 200. As a result, the XMPP server 10 can send the FAX URL "http://app.com/fi1" via the Internet 8 to the MFP 200, and the MFP 200 can receive the FAX information from the APP server 100 using this FAX URL.

Figure 6:
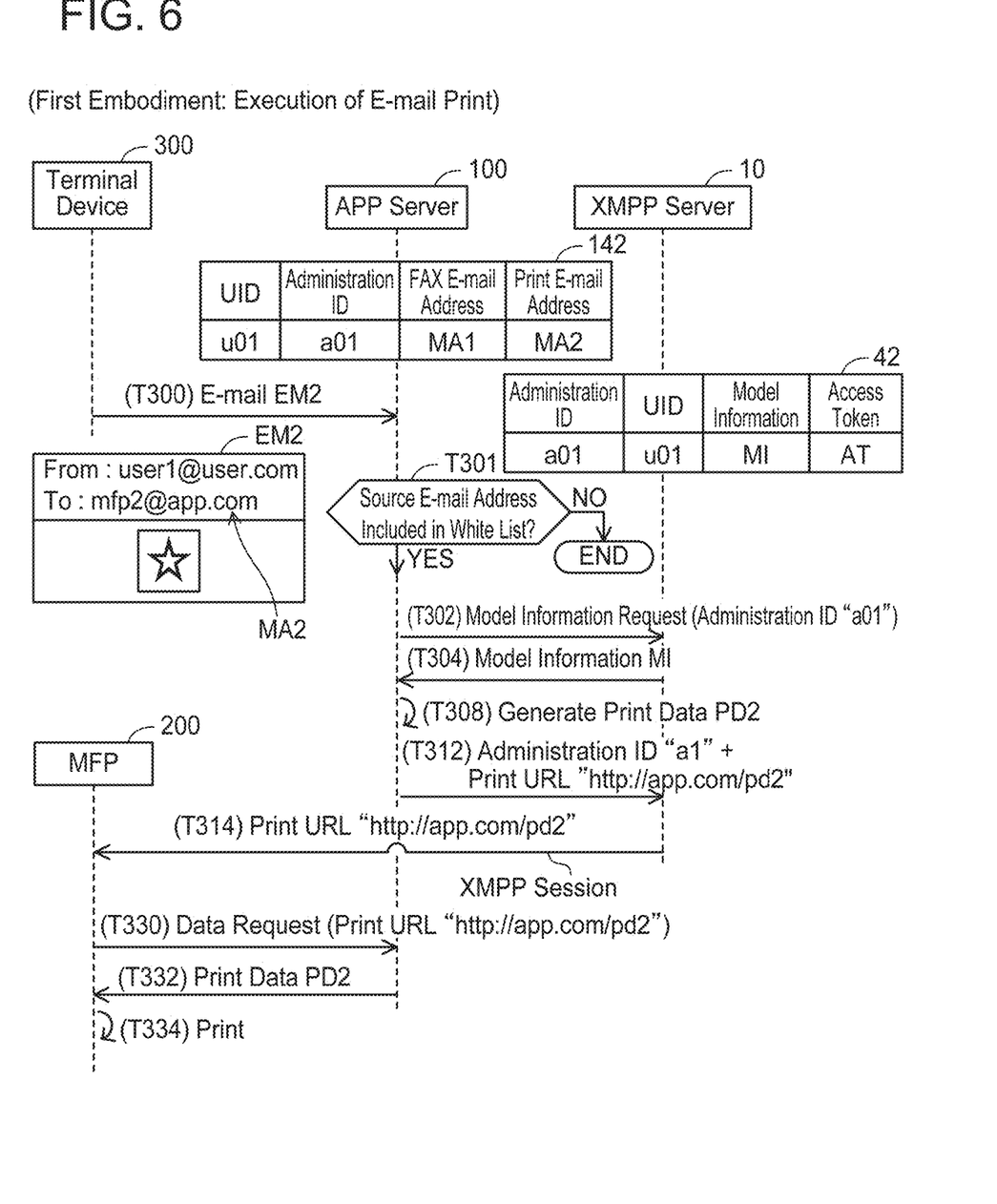
FIG. 6 shows a sequence diagram of a process for executing an e-mail print.

Process for Executing E-mail Print: FIG. 6

A process for executing the e-mail print will be described with reference to FIG. 6. In T300, the terminal device 300 sends an e-mail EM2 including the print e-mail address MA2 as a destination address to the APP server 100. The e-mail EM2 includes image data corresponding to an image to be printed.

When receiving the e-mail EM2 from the terminal device 300 in T300, the APP server 100 identifies the UID "u01" and the administration ID "a01", which are stored in association with the print e-mail address MA2 included in the e-mail EM2, from the device table 142. Then, the APP server 100 identifies the white list 146 stored in association with the identified UID "u01" from the memory 134.

T301 to T304 are similar to T201 to T204 of FIG. 5. In T308, the APP server 100 converts the image data included in the e-mail EM2 by using the model information MI, to generate print data PD2 having a data format which the MFP 200 can interpret. Here, the APP server 100 generates the print data PD2 in accordance with a print setting (such as a paper size) inputted to the APP server 100 by the user. In a variant, the APP server 100 may generate the print data PD2 in accordance with a print setting described in a message body of the e-mail EM2.

T312 and T314 are similar to T212 and T214 of FIG. 5 except that communication of a print URL "http://app.com/pd2" is executed. The print URL "http://app.com/pd2" indicates a location within the APP server 100 where the print data PD2 is stored, and a character string "pd2" is a file name of the print data PD2.

T330 is similar to T230 of FIG. 5 except that the MFP 200 sends a data request including the print URL "http://app.com/pd2". As aforementioned, the data request is an HTTP command. By using the print URL, the print data can be received from the APP server 100 using a general-purpose HTTP command.

When receiving the data request from the MFP 200 in T330, the APP server 100 obtains the print data PD2 from the location within the APP server 100 indicated by the print URL "http://app.com/pd2".

In T332, the APP server 100 sends the print data PD2 to the MFP 200. Due to this, the MFP 200 prints the image corresponding to the print data PD2 in T334.

According to this configuration, the XMPP server 10 can send not only the FAX URL but also the print URL to the MFP 200 without being interrupted by the firewall between the XMPP server 10 and the MFP 200.

Further, in a case of receiving the e-mail EM2 including the print e-mail address MA2, which is different from the FAX e-mail address MA1, as the destination address (T300), the APP server 100 sends the print URL to the XMPP server 10 (T312). Due to this, the XMPP server 10 sends the print URL to the MFP 200 using the XMPP session. That is, the user generates the e-mail EM1 including the FAX e-mail address MA1 in the case of using the e-mail FAX, while the user generates the e-mail EM2 including the print e-mail address MA2 in the case of using the e-mail print. The user can separate the uses of the e-mail FAX and the e-mail print according to selection of the e-mail address. This improves convenience for the user.

Corresponding Relationships

The XMPP server 10 and the APP server 100 are examples of a "server". The XMPP server 10 and the APP server 100 are respectively examples of a "first server" and a "second server". The memory 134 is an example of a "memory". The MFP 200 and the terminal device 300 are respectively examples of a "function execution device" and a "terminal device". The XMPP session is an example of a "session". The image data included in the e-mail EM1 of T200, the FAX e-mail address MA1, the e-mail EM1, and the FAX URL of T214 of FIG. 5 are respectively examples of "first image data", a "first e-mail address", a "first e-mail", and "facsimile request information". The FAX URL of T212 of FIG. 5 is an example of "related information". The image data included in the e-mail EM2 of T300, the print e-mail address MA2, the e-mail EM2, and the print URL of T314 of FIG. 6 are respectively examples of "second image data", a "second e-mail address", a "second e-mail", and "print request information". The white list 146 is an example of a "determination list". The e-mail addresses MA1, MA2 of T82 of FIG. 3 and the print data PD1 of T132 of FIG. 4 are examples of "output information".

T70 of FIGS. 3, T200 and T214 of FIG. 5 are respectively examples of "establish a session with a function execution device", "receive first image data from a terminal device", and "send facsimile request information to the function execution device".

Second Embodiment

The e-mail FAX is executed in the first embodiment. Instead of this, in a second embodiment, an application FAX is executed. In the application FAX, the APP server 100 receives an HTTP command including image data, instead of an e-mail including image data. Due to this, the APP server 100 and the XMPP server 10 operate in cooperation to cause the MFP 200 to execute a facsimile transmission of an image corresponding to the image data included in the HTTP command.

Configuration of APP Server 100: FIG. 2

The APP server 100 of the present embodiment is similar to the APP server 100 of the first embodiment except that information in the device table 142 is different. Specifically, the device table 142 stores a UID, an administration ID, and a terminal ID, which is identification information of a terminal device, in association with each other.

Setup Process: FIG. 3

A setup process of the present embodiment will be described with reference to FIG. 3. A setup process of the present embodiment is similar to the setup process of the first embodiment except that contents of T10, T20, T36, and T50 are different and the processes of T12, T80 to T84 and the process of FIG. 4 are not executed.

In T10, the APP server 100 receives a registration request including the UID "u01" and a terminal ID "t01" from the terminal device 300. Due to this, in T20, the APP server 100 stores the UID "u01", the administration ID "a01", and the terminal ID "t01" in association with each other in the device table 142. Further, in T36, the APP server 100 sends the PIN code C received from the XMPP server 10 to the terminal device 300. Due to this, the terminal device 300 displays the PIN code C.

In T50, the MFP 200 accepts input of the PIN code C from the user. Then, the MFP 200 sends an establishment request including the inputted PIN code C to the XMPP server 10.

Figure 7:
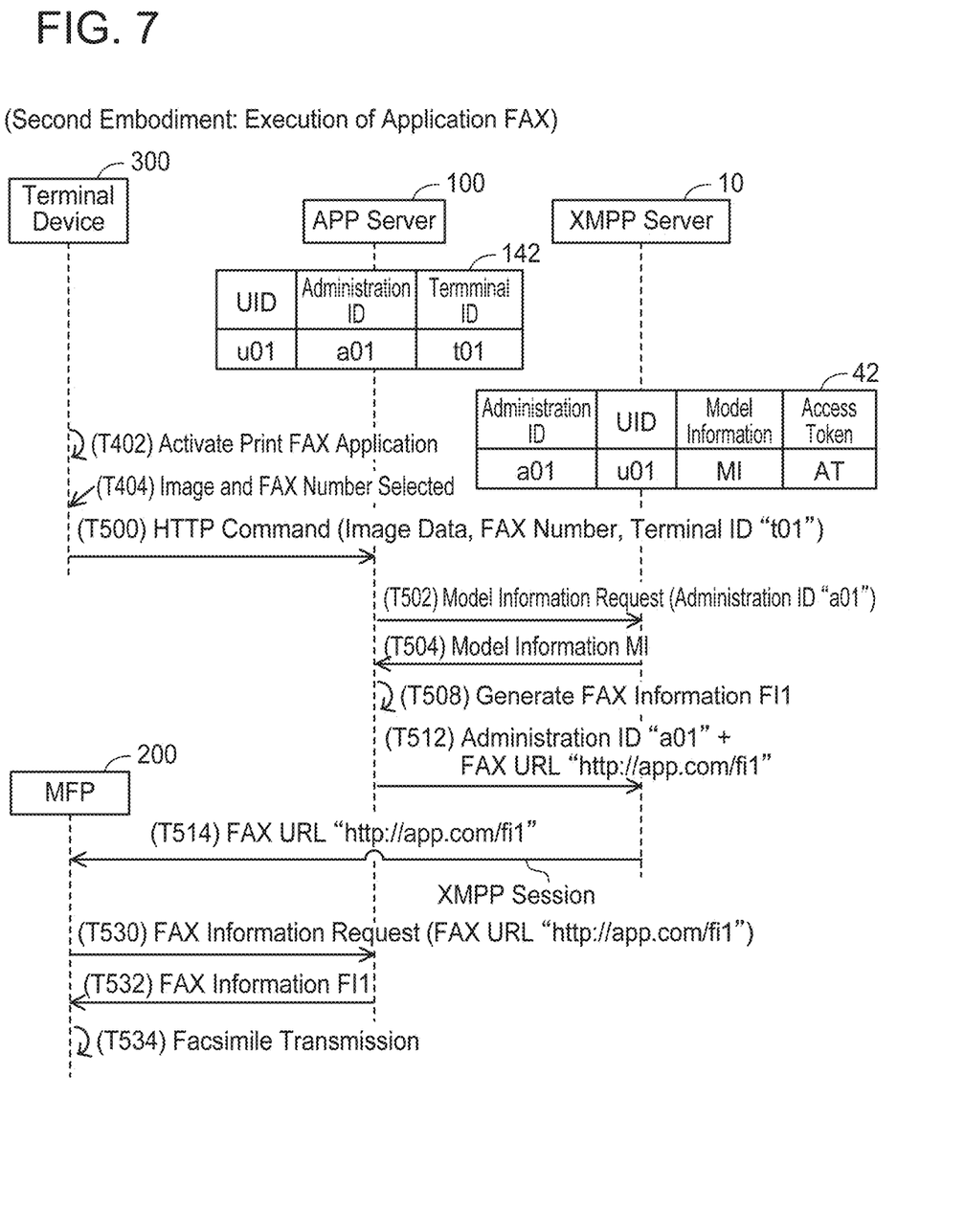
FIG. 7 shows a sequence diagram of a process for executing an application FAX according to a second embodiment.

Process for Executing Application FAX: FIG. 7

A process for executing the application FAX will be described with reference to FIG. 7. In T402, the terminal device 300 activates a print FAX application for executing printing and facsimile transmission of an image in response to an operation by the user. The terminal device 300 displays a selection screen on which a target image of facsimile transmission and a FAX number are selected, in accordance with the print FAX application.

In T404, the terminal device 300 accepts selection of an image and a FAX number in the selection screen. In T500, the terminal device 300 sends an HTTP command including image data corresponding to the selected image, the selected FAX number, and the terminal ID "t01" to the APP server 100.

When receiving the HTTP command in T500, the APP server 100 identifies the UID "u01" and the administration ID "a01", which are stored in association with the terminal ID "t01" included in the HTTP command, from the device table 142. T502 to T534 are similar to T202 to T234 of FIG. 5.

According to this configuration, the XMPP server 10 uses the XMPP session to send the FAX URL "http://app.com/fi1" to the MFP 200 (T514) in a case of receiving the HTTP command including the image data from the terminal device 300. In the present embodiment as well, by using the XMPP session for executing the server-push communication, the XMPP server 10 can send the FAX URL "http://app.com/fi1" to the MFP 200 without being interrupted by the firewall between the XMPP server 10 and the MFP 200.

Corresponding Relationship

The image data included in the HTTP command of T500 of FIG. 7 is an example of the "first image data".

(Variant 1) The "function execution device" is not limited to the MFP 200, and may be a facsimile device configured to execute only a facsimile function.

(Variant 2) In the above first embodiment, the APP server 100 generates the FAX e-mail address MA1 and the print e-mail address MA2 (T12 of FIG. 3). Instead of this, the APP server 100 may generate only the FAX e-mail address MA1. In this variant, the "second e-mail address" may be omitted. In another variant, the APP server 100 may generate one common e-mail address that is used for both the e-mail FAX and the e-mail print. In this case, the APP server 100 may determine that the e-mail FAX is to be executed in a case of receiving an e-mail including the common e-mail address and a FAX number, and may determine that the e-mail print is to be executed in a case of receiving an e-mail that includes the common e-mail address but does not include a FAX number. In general terms, the "first e-mail address" and the "second e-mail address" may be the same.

(Variant 3) In each of the above embodiments, the APP server 100 stores the white list 146. Instead of this, the APP server 100 may store a blacklist. In this case, for example, the APP server 100 may determine in T81 of FIG. 3 whether the blacklist has been registered in the APP server 100. Further, for example, the APP server 100 may determine in T201 of FIG. 5 whether the source e-mail address is included in the blacklist. Then, the APP server 100 may execute the processes from T202 in a case of determining that the source e-mail address is not included in the blacklist. In this variant, the blacklist is an example of the "determination list".

(Variant 4) In each of the above embodiments, the XMPP server 10 uses the XMPP session to send the FAX URL to the MFP 200 (T214 of FIGS. 5 and T314 of FIG. 6). Instead of this, the XMPP server 10 may send information in which the FAX URL is encrypted to the MFP 200. In this variant, the information in which the FAX URL is encrypted is an example of the "facsimile request information".

(Variant 5) The process of FIG. 6 may not be executed. In this variant, "receive second image data" and "send print request information" may be omitted.

(Variant 6) In each of the above embodiments, the APP server 100 registers the e-mail addresses MA1, MA2 to the APP server 100 (T20 of FIG. 3) in the case of receiving the registration request from the MFP 200. Instead of this, the e-mail addresses MA1, MA2 may be pre-registered in the APP server 100. In this variant, "registration request" may be omitted.

(Variant 7) The process of T81 of FIG. 3 may not be executed. In this variant, "determine whether a determination list is registered in the memory" may be omitted.

(Variant 8) In each of the above embodiments, the communication system 2 is provided with the XMPP server 10 and the APP server 100. Instead of this, the communication system 2 may be provided with a single specific server. In this case, the specific server establishes an XMPP session with the MFP 200. Then, in a case of receiving the e-mail EM1 from the terminal device 300, the specific server may use the XMPP session to send, to the MFP 200, the FAX URL of the FAX information FI1 corresponding to the image data included in the e-mail EM1. In this variant, the specific server is an example of the "server". Further, the "first server", the "second server", and the "related information" may be omitted.

(Variant 9) The determination on the white list in T201 of FIG. 5 may not be executed. In this variant, "determine whether a source of the first image data is valid by using the determination list" may be omitted. In another variant, the determination on the white list (T201) may be executed for the e-mail FAX, while the determination on the white list (T301 of FIG. 6) may not be executed for the e-mail print. In the facsimile transmission, the information is sent to an external. On the other hand, since the information is printed on a paper medium in the e-mail print, a possibility that the information will be obtained by a third party is low. Due to this, the necessity of the determination on the white list is higher for the e-mail FAX as compared to the e-mail print.

(Variant 10) In each of the above embodiments, the respective processes of FIGS. 3 to 7 are implemented by software (e.g., the programs 40, 140, 240). Instead of this, one or more of the processes may be implemented by hardware such as a logic circuit.

What is claimed is:

1. A server comprising:
a processor; and
a memory storing computer-readable instructions therein, wherein the computer-readable instructions, when executed by the processor, cause the server to:
establish a session with a function execution device via the Internet, the session being for executing server-push communication, the function execution device being capable of executing at least a facsimile function;
receive a first e-mail including first image data from a terminal device via the Internet, the first e-mail including a first e-mail address that includes a domain name of the server as a destination address;
in a case where the first e-mail is received from the terminal device, send facsimile request information to the function execution device via the Internet by using the session, the facsimile request information being for requesting a facsimile transmission of an image corresponding to the first image data;
receive a second e-mail including second image data from the terminal device via the Internet, the second e-mail including a second e-mail address that includes the domain name of the server as a destination address, the second e-mail address being different from the first e-mail address; and
in a case where the second e-mail address is received from the terminal device, send print request information to the function execution device via the Internet by using the session, the print request information being for requesting printing of an image corresponding to the second image data.

2. The server as in claim 1, wherein
the computer-readable instructions, when executed by the processor, further cause the server to:
register the first e-mail address in the memory in a case where a registration request is received from the function execution device via the Internet,
wherein the session is established with the function execution device after the first e-mail address has been registered in the memory.

3. The server as in claim 2, wherein
the computer-readable instructions, when executed by the processor, further cause the server to:
in a case where the first e-mail address is registered in the memory, determine whether a determination list is registered in the memory, the determination list being for determining whether a source of an e-mail is valid;
in a case where it is determined that the determination list is registered in the memory, send, to the function execution device via the Internet, output information for outputting the first e-mail address, wherein in a case where it is determined that the determination list is not registered in the memory, the output information is not sent to the function execution device; and
in a case where the first e-mail is received from the terminal device, determine whether a source of the first e-mail is valid by using the determination list, and wherein in a case where it is determined that the source of the first e-mail is valid, the facsimile request information is sent to the function execution device, and in a case where it is determined that the source of the first e-mail is not valid, the facsimile request information is not sent to the function execution device.

4. The server as in claim 1, wherein the server comprises a first server and a second server, the processor comprises a first processor in the first server and a second processor in the second server, the memory comprises a first memory in the first server and a second memory in the second server, the computer-readable instructions comprise first computer-readable instructions stored in the first memory and second computer-readable instructions stored in the second memory, wherein the first computer-readable instructions, when executed by the first processor, cause the first server to:

establish the session with the function execution device, wherein the second computer-readable instructions, when executed by the second processor, cause the second server to:

receive the first e-mail including the first image data from the terminal device; and in a case where the first e-mail is received from the terminal device, send related information which is related to the first image data to the first server, wherein the first computer-readable instructions, when executed by the first processor, cause the first server to:

in a case where the related information is received from the second server, send the facsimile request information corresponding to the related information to the function execution device, wherein the second computer-readable instructions, when executed by the second processor, further cause the second server to:

after the facsimile request information has been sent to the function execution device, receive the related information corresponding to the facsimile request information from the function execution device; and in a case where the related information is received from the function execution device, send facsimile information to the function execution device, the facsimile information being obtained by using the first image data related to the related information.

5. The server as in claim 1, wherein the memory is configured to store a determination list for determining whether a source of image data is valid, wherein the computer-readable instructions, when executed by the processor, further cause the server to:

in the case where the first e-mail is received from the terminal device, determine whether a source of the first e-mail is valid by using the determination list, and wherein in a case where it is determined that the source of the first e-mail is valid, the facsimile request information is sent to the function execution device, and in a case where it is determined that the source of the first e-mail is not valid, the facsimile request information is not sent to the function execution device.

6. The server as in claim 1, wherein the session is in accordance with Extensible Messaging and Presence Protocol.

7. A non-transitory computer-readable medium storing computer-readable instructions for a server, wherein the computer-readable instructions, when executed by a processor of the server, cause the server to:

establish a session with a function execution device via the Internet, the session being for executing server-push communication, the function execution device being capable of executing at least a facsimile function;

receive a first e-mail including first image data from a terminal device via the Internet, the first e-mail including a first e-mail address that includes a domain name of the server as a destination address;

in a case where the first e-mail is received from the terminal device, send facsimile request information to the function execution device via the Internet by using the session, the facsimile request information being for requesting a facsimile transmission of an image corresponding to the first image data;

receive a second e-mail including second image data from the terminal device via the Internet, the second e-mail including a second e-mail address that includes the domain name of the server as a destination address, the second e-mail address being different from the first e-mail address; and in a case where the second e-mail address is received from the terminal device, send print request information to the function execution device via the Internet by using the session, the print request information being for requesting printing of an image corresponding to the second image data.

8. A server comprising:

a processor; and a memory storing computer-readable instructions therein, wherein the computer-readable instructions, when executed by the processor, cause the server to:

register a first e-mail address that includes a domain name of the server as a destination address in the memory in a case where a registration request is received from a function execution device via the Internet;

in a case where the first e-mail address is registered in the memory, determine whether a determination list is registered in the memory, the determination list being for determining whether a source of an e-mail is valid;

in a case where it is determined that the determination list is registered in the memory, send, to the function execution device via the Internet, output information for outputting the first e-mail address, wherein in a case where it is determined that the determination list is not registered in the memory, the output information is not sent to the function execution device;

after the first e-mail address has been registered in the memory, establish a session with a function execution device via the Internet, the session being for executing server-push communication, the function execution device being capable of executing at least a facsimile function;

receive a first e-mail including first image data from a terminal device via the Internet;

in a case where the first e-mail is received from the terminal device, determine whether a source of the first e-mail is valid by using the determination list; and in a case where the first image data is received from the terminal device and it is determined that the source of the first e-mail is valid, send facsimile request information to the function execution device via the Internet by using the session, the facsimile request information being for requesting a facsimile transmission of an image corresponding to the first image data, wherein in a case where it is determined that the source of the first e-mail is not valid, the facsimile request information is not sent to the function execution device.

9. The server as in claim 8, wherein
the server comprises a first server and a second server,
the processor comprises a first processor in the first server and a second processor in the second server,
the memory comprises a first memory in the first server and a second memory in the second server,
the computer-readable instructions comprise first computer-readable instructions stored in the first memory and second computer-readable instructions stored in the second memory,
wherein the first computer-readable instructions, when executed by the first processor, cause the first server to:
establish the session with the function execution device,
wherein the second computer-readable instructions, when executed by the second processor, cause the second server to:
receive the first e-mail including the first image data from the terminal device; and
in a case where the first e-mail is received from the terminal device, send related information which is related to the first image data to the first server,
wherein the first computer-readable instructions, when executed by the first processor, cause the first server to:
in a case where the related information is received from the second server, send the facsimile request information corresponding to the related information to the function execution device,
wherein the second computer-readable instructions, when executed by the second processor, further cause the second server to:
after the facsimile request information has been sent to the function execution device, receive the related information corresponding to the facsimile request information from the function execution device; and
in a case where the related information is received from the function execution device, send facsimile information to the function execution device, the facsimile information being obtained by using the first image data related to the related information.

10. The server as in claim 8, wherein
the session is in accordance with Extensible Messaging and Presence Protocol.

11. A non-transitory computer-readable medium storing computer-readable instructions for a server, wherein the computer-readable instructions, when executed by a processor of the server, cause the server to:
register a first e-mail address that includes a domain name of the server as a destination address in the memory in a case where a registration request is received from a function execution device via the Internet;
in a case where the first e-mail address is registered in the memory, determine whether a determination list is registered in the memory, the determination list being for determining whether a source of an e-mail is valid;
in a case where it is determined that the determination list is registered in the memory, send, to the function execution device via the Internet, output information for outputting the first e-mail address, wherein in a case where it is determined that the determination list is not registered in the memory, the output information is not sent to the function execution device;
after the first e-mail address has been registered in the memory, establish a session with a function execution device via the Internet, the session being for executing server-push communication, the function execution device being capable of executing at least a facsimile function;
receive a first e-mail including first image data from a terminal device via the Internet;
in a case where the first e-mail is received from the terminal device, determine whether a source of the first e-mail is valid by using the determination list; and
in a case where the first image data is received from the terminal device and it is determined that the source of the first e-mail is valid, send facsimile request information to the function execution device via the Internet by using the session, the facsimile request information being for requesting a facsimile transmission of an image corresponding to the first image data, wherein in a case where it is determined that the source of the first e-mail is not valid, the facsimile request information is not sent to the function execution device.

* * * * *